350-96.24

XR 3,735,142

SEARCH ROOM

United States Patent [19]

Harr et al.

SUBSTITUTE FOR MISSING XR

[11] 3,735,142

[45] May 22, 1973

[54] MANUALLY OPERATED BAR CODING SCANNING SYSTEM

[75] Inventors: Jerome Danforth Harr, San Jose; David Harwood McMurtry, Portola Valley, both of Calif.

[73] Assignee: International Business Machines Corporation, Armonk, N.Y.

[22] Filed: Feb. 4, 1972

[21] Appl. No.: 223,555

[52] U.S. Cl. .........250/219 D, 235/61.11 E, 250/227

[51] Int. Cl. .............................................G01n 21/30

[58] Field of Search ....................250/219 D, 219 DD, 250/219 DC, 227, 234; 235/61.11 E; 350/96 R, 96 B

[56] References Cited

UNITED STATES PATENTS

| | | | |
|---|---|---|---|
| 3,509,353 | 4/1970 | Sunblad | 250/227 |
| 3,474,234 | 10/1969 | Rieger | 250/219 D |
| 3,584,779 | 6/1971 | Kessler | 250/227 |
| 3,418,456 | 12/1968 | Hamisch | 250/219 DC |
| 3,610,891 | 10/1971 | Raciazek | 250/219 D |
| 3,509,354 | 4/1970 | Reilly | 250/219 D |
| 3,334,236 | 8/1967 | Bacon | 235/61.11 E |
| 3,585,367 | 6/1971 | Humbarger | 250/219 DD |
| 3,449,581 | 6/1969 | Rubin | 250/227 |

*Primary Examiner*—James W. Lawrence
*Assistant Examiner*—D. C. Nelms
*Attorney*—George E. Roush, Richard E. Cummins and J. Jancin, Jr.

[57] ABSTRACT

A low-cost hand held probe for scanning bar coding documents of high density comprises a bundle of many discrete optical image fibers which is optically constricted into a light carrying conduit of bar-shaped cross-section by means of an aperture plate having a single elongated aperture stop therein. The aperture transmits light from a source of illumination down the optical conduit to a paper document. The light is reflected from the document in preparation to the bar coding indicia thereon and is transmitted back up through the conduit to a photosensitive device coupled to circuitry for determining the degree of light reflected. The optical bundle is preferably tapered and is drawn in a unit which eliminates critical alignment problems and reduces the number of operations for manufacture. No critical movement on the part of the operator is required in orienting the probe with respect to the document being scanned. One embodiment comprises an offset optical fiber tip arranged to rotate at the end of the probe in caster-like fashion. In other embodiments a flexible fiber optic conduit permits the use of larger and more complex illumination and photoresponsive devices without unduly handicapping the operator.

10 Claims, 6 Drawing Figures

MANUALLY OPERATED BAR CODING SCANNING SYSTEM

The invention of the instant application stems from the endeavors resulting in the inventions described and claimed in the copending U. S. Pat. applications Ser. No. 158,366 of David Harwood McMurtry filed on June 30, 1971 for "Hand Probe for Manually Operated Scanning System," (and) Ser. No. 198,331 of Jerome Danforth Harr filed on Nov. 12, 1971 for "Optical Bar Coding Scanning Apparatus," and number 223,603 of David Harwood McMurtry filed on the same day as the instant application for "Optical System for Optical Fiber Bundle Scanning Apparatus."

The invention relates to optical scanning systems, and it particularly pertains to hand held probes for such systems, especially for scanning documents having in indicia thereon in the form of closely spaced parallel lines.

Hand held optical scanning systems of the type hereinafter disclosed are old in general as is reflected in the following U.S. Pats.:

| | | | |
|---|---|---|---|
| 2,406,299 | 8/1946 | Koulicovitch | 250–41.5 |
| 2,410,104 | 10/1946 | Rainey | 250–41.5 |
| 2,420,716 | 5/1947 | Morton et al. | 250–41.5 |
| 3,229,075 | 1/1960 | Palti | 235–61.11 |
| 3,278,754 | 11/1966 | Wallace | 250–223 |
| 3,327,584 | 6/1967 | Kissinger | 88–14 |
| 3,359,405 | 12/1967 | Sundblad | 235–61.11 |
| 3,417,234 | 12/1968 | Sundblad | 235–61.11 |
| 3,509,353 | 4/1970 | Sundblad et al. | 250–227 |

In the following foreign patent:

| | | | |
|---|---|---|---|
| Russian | 10/1967 | Moroz | 195,033 |

and the following article in the technical literature: M. Sokolski, "Improved Fiber Optic Read Head," IBM Technical Disclosure Bulletin, Vol. 8, No. 11, Apr. 1966, page 1580.

These prior art arrangements serve well for the purposes intended. However, they are expensive to manufacture, incapable of providing the higher contrast over shorter span of scan needed, too difficult to orient and too unwieldy for present day applications. In such applications little or no training is given the operator in obtaining reliable data for application to an electronic data processing system which preferably is coupled to many such inputs almost continually during a normal working day.

The objects indirectly referred to hereinbefore and those that will appear as the specification progresses are attained in a hand held probe of simple construction. A single coherent optical fiber bundle, preferably tapered, has the distal end arranged for direct contact with the document to be scanned. At the proximate end an aperture stop is arranged across the optical fiber conduit. This aperture stop comprises a single centrally located elongated aperture Light from a suitable source of illumination is directed onto the aperture for transmitting light down to the document through the central fibers. Light reflected from the document is transmitted up the fibers to a photosensitive device which is arranged thereabove. Electronic circuitry connected to the photosensitive device is arranged for reducing the data determined by scanning for application to the data processing system.

For scanning in a given direction, an offset probe tip is used and arranged in a rotatable nose piece which is arranged to follow behind the probe in the direction of scan at the optimum orientation angle.

It is contemplated that the intensity of the light and the resolution of the indicia on the document be made with components much larger than conveniently installed in a hand probe of the desired size and configuration. Accordingly the illuminating and sensing components are arranged in a cabinet of suitable size and a much smaller probe with an aperture stop and a tapered fiber optical bundle is connected to the components in this cabinet by means of a flexible non-imaging bundle of optical fibers.

In order that full advantage of the invention may be obtained in practice, preferred embodiments thereof, given by way of example only, are described in detail hereinafter with reference to the accompanying drawing, forming a part of the specification, and in which.

Figure 1:
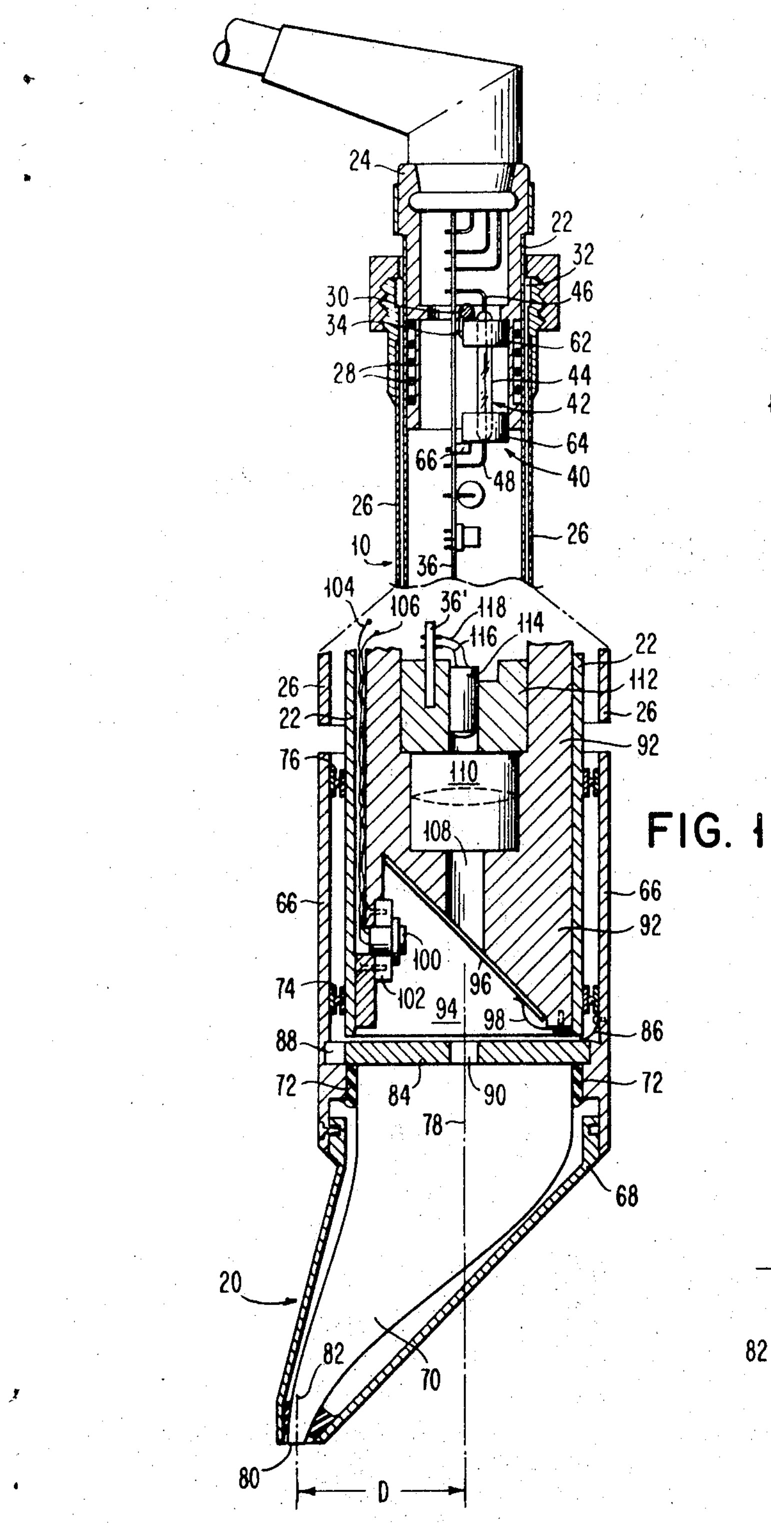
FIG. 1 is a cross section view of a hand held optical bar scanning probe according to the invention.

A unitary embodiment of an optical scanning assembly according to the invention is shown in FIG. 1. A hand-held probe 10 is touched to the document to be scanned. In this system, as in many such systems, it is desirable that a switch be closed when the probe 10 is touched to a document to be scanned. The probe 10 comprises a nose piece 20 which is fitted to a cylindrical barrel 22. The upper end of the barrel 22 has an end fitting 24 arranged therein. Arranged about the barrel 22 is a tubular sleeve 26 which is grasped by the hand of the operator using the probe. A spring 28 arranged in the end fitting 24 has one end pressing between the barrel 22 by way of the end fitting 24 and a switch actuating pin 30. The latter is fastened to a collar 32 surrounding the barrel 22 and passes through a slot 34 in the barrel. The upper end of slot 34 determines the normal relationship of the barrel 22 and the sleeve 26. The slot 34 also confines the movement of the pin 30 to vertical movement; while the sleeve 26 and the collar 32 are allowed full freedom to move vertically and to rotate about the barrel 22. A circuit board 36 of conventional form is arranged in the barrel 22 to one side of the slot 34. An electric switch assembly 40 such as that shown and described in the copending U. S. Pat. application Ser. No. 158,754 of Joseph Emanuel Shepard filed on July 1, 1971 is arranged in operating relationship to the pin 30. When the operator, using the probe 10, presses the nosepiece 20 against the document to be scanned, the motion of the sleeve 26 forces the switch actuating pin 30 downward relatively in the slot 34. This relative movement is used to actuate the electric switch assembly 40.

The electric switch assembly 40 comprises a magnetic reed switch capsule 42. The capsule 42 comprises a glass envelope 44 with a pair of electric leads 46, 48 in the walls. These electric leads 46, 48 are connected to a pair of magnetic reed elements having electric contacts centrally of the envelope 44. A pair of tubular magnets 62, 64 are slidably arranged about the envelope 44. The opposing annular faces of the tubular magnets are are of like poles. The magnets 62 and 64 repel each other so that in the unactuated position the magnets 62, 64 are urged against the switch actuating pin 30 and the stop 66 respectively. When the pin 30 is moved relatively downward the magnet 62 travels to the center of the envelope 44 and the magnetic field thus moved downward causes the magnetic reeds to bring the contacts together completing the electric circuit and indicating that the probe 10 is operative.

A carriage comprising tubular fitting 66 is arranged on the barrel 22 at the lower end of the probe 10. The tubular carriage fitting 66 is concentrically mounted about the tubular barrel 22 for carrying protective metal guard 68 and an optical fiber bundle 70. The latter is shown held in place in the carriage fitting 66 by means of cement 72, of which there are a number of commercially available cements which are suitable for the purpose. Cements compounded with rubber offer a desirable coefficient of expansion between glass and metal or plastic. The carriage is held on the barrel 22 by a pair of conventional ball bearing races 74 and 76 which restrain the assembly of the carriage fitting 66, the guard 68 and the bundle 70 in the axial direction while permitting 360° rotation about the central longitudinal axis indicated by the chain line 78. The lower tip 80 of the optical fiber bundle 70 is offset from the main axis by a distance D indicated between the chain lines 78 and 82. In operation the face of the probe tip 80 is pressed into contact with a document to be scanned with sufficient pressure on the sleeve 26 to operate the electric switch 40 against the tension of the spring 28. The latter spring 28 also effects a friction loading of the tip face against the document sufficient to cause the tip 80 of the optical fiber bundle 70 to trail behind the probe 10, much in the fashion of a furniture caster as the probe 10 is moved across the document.

Figure 2:
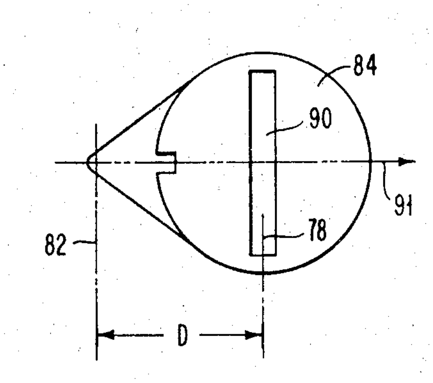
FIG. 2 is a plan view of an aperture stop for a probe shown in place over a probe tip according to the invention.

An aperture stop plate 84 is arranged above the optical fiber bundle 70. This plate 84 is held in place by suitable means, such as a trio of springs one 86 only of which is shown, and oriented by means of an orienting lug 88. An elongated aperture 90 is arranged centrally of the plate 84. As better seen in the plan view of FIG. 2 the longitudinal axis of the rectangular aperture 90 runs in a direction normal to the line 91 between the tip of the bundle 70 and the center of the plate 84. This line 91 is the line of scan as soon as the tip trails the probe. With the arrangement shown, the aperture plate 84 may be readily interchanged with other aperture plates as desired. The surfaces of the aperture plate 84 exposed to light are preferably made light-absorbing by coating with flat black paint or black cellular foam or an anodizing finish as desired. Where interchangeability is not required, the upper surface of the optical fiber bundle 70 can be coated with light-absorbing flat black paint or black cellular foam except for the desired aperture to form the desired aperture stop. In either event the upper surface of the fiber bundle is first coated with anti-reflecting material to reduce loss of light from specular back reflection.

A cylindrical member 92 is arranged in the lower end of the barrel 22 for supporting primary optical elements. A lower end of the cylindrical member 92 has a recess 94 for receiving a half silvered mirror 96 at an angle of substantially 45° to the central axis. The mirror 96 is held in place by any suitable means as a mirror mounting spring 98. A source of light, shown here as a light emitting diode 100 is mounted in the recess 94 on a mounting plate 102. A groove 104 is machined in the cylindrical member 92 to serve as a conduit for electric conductors 104 and 106 leading from the circuit board 36 to the light emitting diode 100. Light from the diode 100 is reflected by the half silvered mirror 96 through the aperture 90 into the optical fiber bundle 70 for illuminating the document to be scanned. The cylindrical member 92 has a bore 108 centrally located for passing light from the aperture 90 through the half silvered mirror 96 to an optical lens system 110. A cylindrical plug 112 is arranged to receive a photosensitive diode 114 having electric leads 116 and 118 brought to terminals on the circuit board 36. Preferably pre-amplifier circuitry is arranged on the circuit board 36. The cylindrical member and the plug are preferably slotted so that the circuit board 36 is positioned within the lower end of the barrel 22 and the parts are oriented so that the electric leads 104, 106 and 116 and 118 are free from any possibility of tangling.

The bundle 70 is made of a number of discrete optical fibers drawn to considerably reduced size. The bundle 70 is operable according to the invention as made with substantially uniform cross section. In most applications, however, the bundle 70 is tapered in the final draw under controlled heat conditions. Also in the final draw the bundle 70, in either case, is given an offset as shown. The fibers at the larger end of the bundle are 0.0005 inches diameter and at the tip are 0.000125 inches in diameter; this represents an end-to-end ratio of 4:1. Though only the central core of the image bundle 70 is utilized for a light conduit, the remainder of the bundle structure provides the necessary rigidity to withstand shock and vibration. The tolerance in forming the light conduit is lessened by 1° with this construction, as is the dimensional tolerance of the aperture 90 by the magnification of the tapered bundle 70. Light traveling through the rectangular light conduit in the optical fibers subtended by the aperture stop 90 result in a pupil 90' at the tip 80 of the fiber bundle 70. At the tip 80 light is reflected from the document in accordance with the presence or absence of marks on the document.

Figure 3:
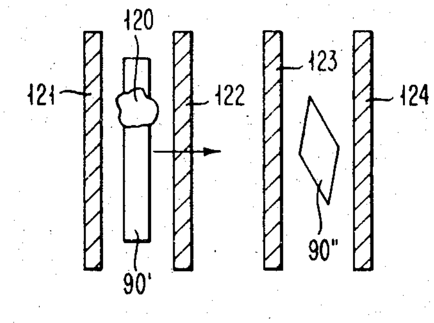
FIG. 3 is a graphical representation of the operation of a probe according to the invention.

Referring to FIG. 3, it will be evident that a blot of ink or other dark spot 120 on the document of substantial portion to the area of the pupil 90' can be tolerated without false reading. The bar coding is represented by the bars 121, 122, 123 and 124 greatly enlarged in this illustration. Note that the blot 120 as shown is substantially large with respect to the bars and to the spaces between the bars which ordinarily might cause a false reading with a circular pupil. But the elongated pupil 90' extends beyond the blot 120 sufficiently for an accurate reading and due to the swivel action of the probe according to the invention moves parallel to and normally across the bars. Electronic circuitry is well known for differentiating between blots of this type and valid bars.

An aperture stop shaped to provide a pupil 90'' is contemplated in some instances in which the swivel action initially is slow in coming to complete orientation.

As hereinbefore described the source of illumination and the photosensitive device are located in the probe proper which is held in the hand of the operator. It is highly desirable to keep the probe dimensions within certain parameters. Those parameters roughly approximate the lengths and diameters of most of the commercially available fountain pens now on the market. Probes have been made and operated successfully with these dimensions, but it is desired, in some applications, that larger sources of illumination and larger photosensitive devices be accommodated.

Figures 4, 5, 6:
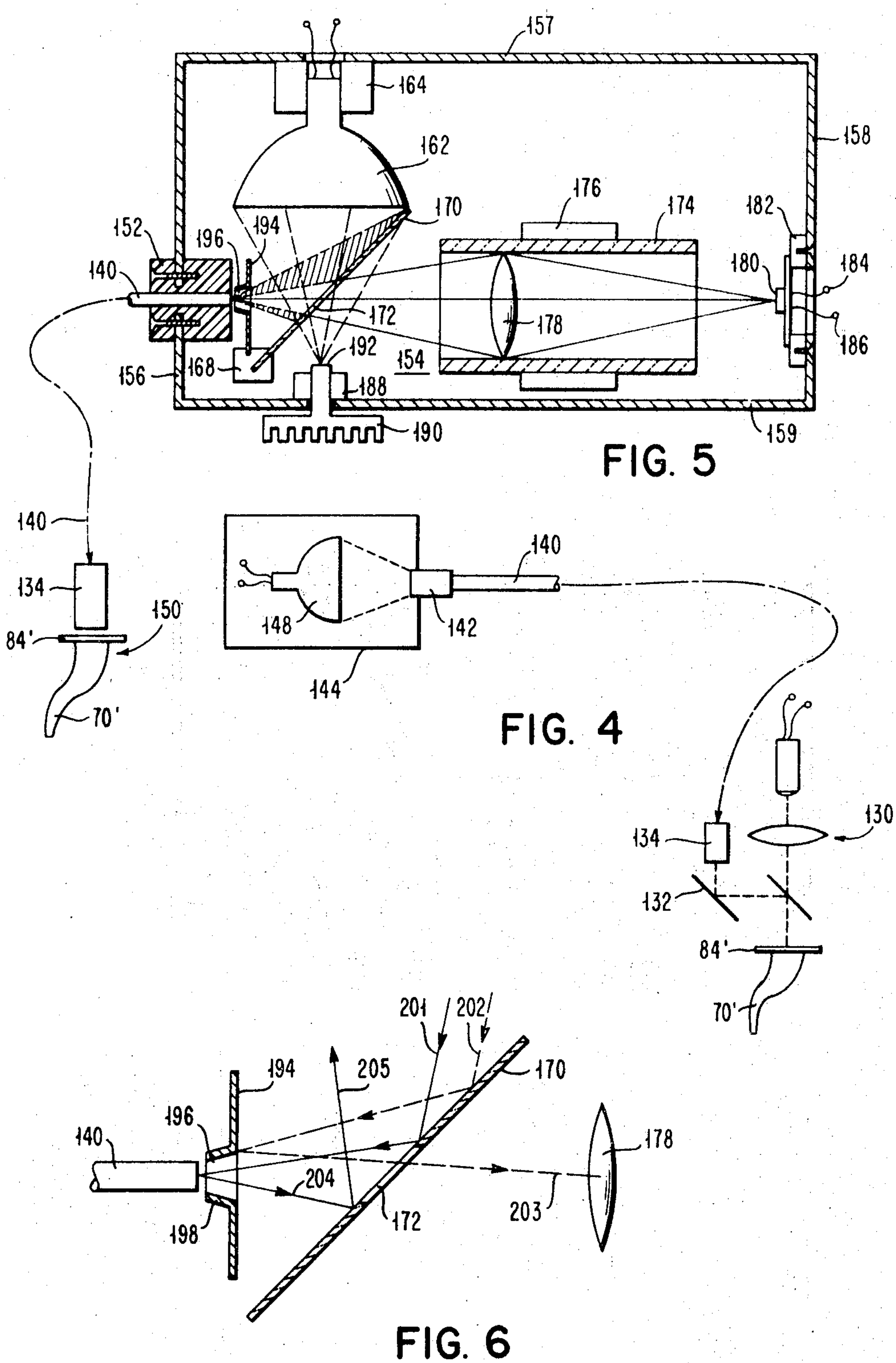
FIGS. 4 and 5 are diagrams of alternate embodiments of hand-held probes according to the invention.
FIG. 6 is an illustration of the operation of a portion of the arrangement shown in FIG. 5.

One such arrangement, as shown in FIG. 4, utilizes a hand-held probe 130 indicated schematically only as an optical fiber bundle 70' and an aperture stop plate 84' which are arranged in the probe substantially as described hereinbefore. The light source components in the barrel of the probe are replaced by a fully silvered mirror 132 and cylindrical clamping member 134 holding one end of a non-imaging optical fiber bundle 140 of some length and considerable flexibility. The other end of the bundle 140 is clamped in a fiber support block 142 mounted in a suitable housing 144. This end of the bundle 140 is preferably coated with an antireflection material. Within the housing a light source and reflector 148 are arranged to focus light on the proximal face of the optical fiber bundle 140. With this arrangement a very high luminous flux is available and conventional arrangements are readily made to dissipate the heat inherently generated.

The arrangement of FIG. 4 has a decided advantage in accommodating preamplifier circuitry within the probe barrel before the signal from the photoresponsive diode 114 is severely attenuated as might be the case with long electric leads in the probe cable. The principal advantage is of course the high light intensity possible without unduly enlarging the probe barrel and without uncomfortable heating of the operator's hand. The cost of the arrangement is approximately proportional to the light intensity desired. It is to be noted that the cost of a non-imaging optical fiber bundle 140 is very much less than would be the case if an imaging bundle were necessary. This is of added importance in regard to the replacement factor inasmuch as there is greater wear on the cable and the bundle than on the probe.

Another embodiment for applications calling for larger components is shown in FIG. 5. Here the probe 150 comprises the tapered bundle 70', the aperture stop plate 84' and the non-imaging bundle 140 as shown schematically.

There are several optical fiber bundle assemblies commercially available in both imaging and non-imaging types. Discrete optical fibers are held firmly at either end. Because the imaging types require care in conforming the two ends while the non-imaging do not, the cost of the latter is of the order of one-tenth of the former—a very appreciable saving. A preferred arrangement is available in the form of a bundle 140 of optical fibers enclosed in a flexible vinyl sheath which is filled with an aqueous solution for insulating and lubricating the individual fibers. Flexible metal or plastic armor is designed to restrain the bending of the fibers below the optical and physical limits (generally accepted as 20 fiber diameters) for prolonging the life of the assembly and insuring proper operation.

The non-imaging optical fiber bundle 140 has the proximal end clamped in a fiber block 152 which is rigidly supported on an optical bench member 154 delineated by cabinet wall portions 156–159. The optical bench member 154 is characterized by that rigidity which is necessary to optical systems of the type disclosed herein and is altogether conventional in this and other respects. The end of the optical fiber bundle 140 is exposed to the interior of the cabinet at or near the edge of the fiber block 152. A suitable light source, for example, an ENA quartz iodine lamp is arranged at the focal point of an aluminized elliptical reflector 162. This lamp and reflector combination is rigidly supported on the optical bench member 154 by a supporting post 164 of conventional construction. A heat-resistant supporting post 168 is fastened to the optical bench member 154 for supporting a dichroic mirror 170 at an angle of substantially 45° to the central axis of the reflector 162 and to the longitudinal axis of the clamped end portion of the optical fiber bundle 140. The lamp and reflector assembly, the mirror 170 and the face at the proximal end of the bundle 140 are arranged so that the light rays from the reflector 162 come to a field the face of the optical fiber bundle 140. The mirror 170 has an elliptical aperture 172 on the axis of the optical fiber bundle 140. An optical lens system 174 is arranged on this same axis and held rigidly in place on a supporting post 176 rigidly mounted on the optical bench member 154. This lens system 174 is entirely conventional in all respects and is represented here merely by a schematic illustration of a lens 178. By means of the lens system 174 light from the optical fiber bundle 140 is focused on a photoresponsive device 180. The device 180 can be any one of a large number of photosensitive devices available. The device 180 is supported by a mounting post 182 rigidly attached to the optical bench member 154. Electric leads 184 and 186 are led through an opening in the wall member 158. The post 182 is arranged to seal the opening to prevent light from straying. A further heat insulating post 188, rigidly attached to the optical bench member 154, supports a heat radiating element 190. The innermost face of the radiator 190 is arranged at the other focal point of the elliptical reflector 162 so that the light passing through the aperture 172 in the mirror 170 is brought to a focus at the interface 192. The interface 192 is preferably blackened for maximum heat transfer out of the cabinetry through an aperture in the wall member 159. Thus excess heat is delivered to the heat sink and radiated externally of the optical system for the light not reflected by the mirror 170. The conical annulus of light reflected by the mirror 170 tends to generate considerable heat at the proximal face of the bundle 140. To prevent the optical fibers from cracking a heat and flare shield 194 is supported by the supporting post 168 in front of the fiber block 152. The shield 194 has an aperture 196 about which there is a collar 198 which is separated from the proximal face of the bundle 140 and the fiber block 152 by a small air gap. The shield 194 is also given a flat black surface by painting or anodizing or coating with black cellular foam and the like.

The operation of the shield 194 is diagrammed in FIG. 6. Light rays intended for illuminating the document such as the ray 201 are reflected from the mirror 170 onto the proximal face of the bundle 140. Other light rays such as ray 202 are prevented from reaching the bundle 140 by the shield 194. The black mat surface on the shield 194 prevents reflection of a ray such as ray 203 from passing through the aperture 172 in the mirror 170. Any light rays such as ray 204 emanating from the optical fiber bundle 140 at an angle outside the aperture 172 are reflected back into the reflector 162 for augmenting the light source. No stray light then enters the lens 178.

While the invention has been shown and described particularly with reference to a preferred embodiment thereof, and various alternatives have been suggested, it should be understood that those skilled in the art may effect still further changes without departing from the spirit and scope of the invention as defined hereinafter.

The invention claimed is:

1. Manually operated optical bar coding scanning apparatus for recovering information encoded in a series of elongated parallel bars laid down on a document in contrasting characteristic to that of said document, comprising a barrel constituting a skeletal member of a hand-held probe, a bundle of coherent light transmitting fibers having one end for contacting a document to be scanned and another end, said one end of said bundle being offset with respect to said other end with the longitudinal axes thereof substantially parallel, a tube in which said bundle is arranged with the longitudinal axes of said bundle at said other end substantially concentric with the axis of said tube and the longitudinal axis of said one end offset therefrom, said tube having the longitudinal axis thereof concentric to that of said barrel and arranged therewith to be relatively and freely rotatable about the longitudinal axes thereof a source of illumination in said apparatus directed toward said other end of said bundle, a photosensitive device in said apparatus directed toward said other end of said bundle, an optical aperture stop having a single elongated aperture therein communicating with said source of illumination and said photosensitive device for transmitting light from said source through a portion of said fibers to said one end forming an optical pupil thereat illuminating said document accordingly and reflecting light from and proportionally to indicia on said document through said portion of said fibers to said other end for transmission to said light sensitive device, whereby said offset longitudinal axis of said one end of said fiber bundle assumes a position behind said longitudinal axes of said other end of said bundle and of said barrel and said tube of the apparatus as directed across the document to be scanned, an elongated non-coherent bundle of light transmitting fibers interposed between said aperture stop and said source of illumination and said photosensitive device, and a mirror arranged between said source of illumination and said photosensitive device for directing said source toward said coherent bundle and toward said device and preventing light from said source traveling directly toward said photosensitive device.

2. Manually operated optical bar coding scanning apparatus for recovering information encoded in a series of elongated parallel bars laid down on a document in contrasting characteristic to that of said document, comprising a bundle of tapered coherent light transmitting fibers having one end for contacting a document to be scanned and a larger end, a source of illumination directed toward said larger end, a photosensitive device directed toward said larger end, said source and said device being arranged in said apparatus for preventing light from said source passing directly to said device, and an optical aperture stop having a single elongated aperture therein communicating with said source of illumination and said photosensitive device for transmitting light from said source through a portion of said fibers to said one end forming an optical pupil thereat illuminating said document accordingly and reflecting light from and proportionally to indicia on said document through said portion of said fibers to said larger end for transmission to said light sensitive device.

3. Manually operated optical bar coding scanning apparatus as defined in claim 2 and wherein said aperture stop comprises a plate having said elongated aperture therein.

4. Manually operated optical bar coding scanning apparatus as defined in claim 2 and wherein said aperture stop comprises a coating of light-absorbing material having said elongated aperture therein.

5. Manually operated optical bar coding scanning apparatus as defined in claim 2 and incorporating an anti-reflection coating on the surface of said bundle beneath said aperture stop.

6. Manually operated optical bar coding scanning apparatus as defined in claim 2 and wherein said one end of said bundle is offset with respect to said larger end with the longitudinal axes thereof substantially parallel.

7. Manually operated optical bar coding scanning apparatus as defined in claim 6 and incorporating a barrel constituting a skeletal member of a hand-held probe, a tube in which said bundle is arranged with the longitudinal axes of said bundle at said larger end substantially concentric with the axis of said tube and the longitudinal axis of said one end offset therefrom, said tube having the longitudinal axis thereof concentric to that of said barrel and arranged therewith to be relatively and freely rotatable about the longitudinal axes thereof whereby said offset longitudinal axis of said one end of said fiber bundle bundle assumes a position behind said longitudinal axes said larger end of said bundle and of said barrel and said tube of the apparatus as directed across the document to be scanned.

8. Manually operated optical scanning apparatus as defined in claim 7 and wherein said elongated aperture is aligned in the direction of the bars on the document as the document is scanned.

9. Manually operated optical bar coding scanning apparatus as defined in claim 7 and incorporating, a sleeve concentric with said barrel and said tube and arranged for relative movement in the direction of the longitudinal axes thereof, an electric switch arranged within said barrel and said sleeve for actuation in accordance with said relative movement as resulting from the act of pressing the tip of said bundle against the document to be scanned by urging said tube toward said document.

10. Manually operated optical bar coding scanning apparatus for recovering information encoded in a series of elongated parallel bars laid down on a document in contrasting characteristic to that of said document, comprising a bundle of coherent light transmitting fibers having one end for contacting a document to be scanned and another end, a source of illumination directed toward said other end, a photosensitive device directed toward said other end, said source and said device being arranged in said apparatus for preventing light from said source passing directly to said device, and an optical aperture stop arranged at said other end and having a single elongated aperture therein open to said source of illumination and said photosensitive device for transmitting light from said source through a portion of said fibers to said one end forming an optical pupil thereat illuminating said document accordingly and reflecting light from and proportionally to indicia on said document through said portion of said fibers to said other end for transmission to said light sensitive device at said other end, said one end of said bundle being offset with respect to said other end with the longitudinal axes thereof substantially parallel, and arranged therewith to be relatively and freely rotatable about the longitudinal axes thereof, whereby said offset longitudinal axis of said one end of said fiber bundle assumes a position behind said longitudinal axes of said other end of said bundle of the apparatus as directed across the document to be scanned.

* * * * *